United States Patent
Goenawan et al.

(10) Patent No.: US 11,959,764 B2
(45) Date of Patent: Apr. 16, 2024

(54) AUTOMATED ASSISTANT THAT DETECTS AND SUPPLEMENTS VARIOUS VEHICLE COMPUTING DEVICE CAPABILITIES

(71) Applicant: Google LLC, Mountain View, CA (US)

(72) Inventors: Effie Goenawan, San Francisco, CA (US); Abraham Lee, Belmont, CA (US); Arvind Sivaram Sharma, Mountain View, CA (US); Austin Chang, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 388 days.

(21) Appl. No.: 17/221,540

(22) Filed: Apr. 2, 2021

(65) Prior Publication Data
US 2022/0316904 A1    Oct. 6, 2022

(51) Int. Cl.
*G01C 21/36* (2006.01)
*G06F 3/14* (2006.01)
(Continued)

(52) U.S. Cl.
CPC ..... *G01C 21/3629* (2013.01); *G01C 21/3608* (2013.01); *G01C 21/3667* (2013.01);
(Continued)

(58) Field of Classification Search
CPC ............ G01C 21/3629; G01C 21/3608; G01C 21/3667; G06F 3/14; G06F 3/167;
(Continued)

(56) References Cited

U.S. PATENT DOCUMENTS 10,198,877 B1 *   2/2019  Maltsev ................. G07C 5/006
2019/0361671 A1 * 11/2019  Maltsev ................. G10L 15/22
(Continued)

FOREIGN PATENT DOCUMENTS

CN       111708648       12/2020

OTHER PUBLICATIONS

CN111708648B, Method and system for designing vehicle-machine interconnection application framework, published Dec. 4, 2020, pp. 1-12 (Year: 2020).*
(Continued)

*Primary Examiner* — Shahid K Khan
*Assistant Examiner* — Ahamed I Nazar
(74) *Attorney, Agent, or Firm* — Gray Ice Higdon

(57) ABSTRACT

Implementations set forth herein relate to interactions, between vehicle computing devices and mobile computing devices, that reduce duplicative processes from occurring at either device. Reduction of such processes can be performed, in some instances, via communications between a vehicle computing device and a mobile computing device in order to determine, for example, how to uniquely render content at an interface of each respective computing device while the user is driving the vehicle. These communications can occur before a user has entered a vehicle, while the user is in the vehicle, and/or after a user has left the vehicle. For instance, just before a user enters a vehicle, a vehicle computing device can be primed for certain automated assistant interactions between the user and their mobile computing device. Alternatively, or additionally, the user can authorize the vehicle computing device to perform certain processes immediately after leaving the vehicle.

16 Claims, 8 Drawing Sheets

(51) Int. Cl.
  *G06F 3/16* (2006.01)
  *G06F 21/32* (2013.01)
  *G10L 15/08* (2006.01)
  *G10L 15/22* (2006.01)

(52) U.S. Cl.
  CPC .............. *G06F 3/14* (2013.01); *G06F 3/167* (2013.01); *G06F 21/32* (2013.01); *G10L 15/083* (2013.01); *G10L 2015/088* (2013.01)

(58) Field of Classification Search
  CPC ....... G06F 21/32; G06F 3/147; G10L 15/083; G10L 2015/088; G10L 2015/223; G10L 15/22; G09G 2380/10
  USPC .......................................................... 715/866
  See application file for complete search history.

(56) References Cited

U.S. PATENT DOCUMENTS

2020/0356339 A1  11/2020  Krishnan et al.
2021/0335036 A1*  10/2021  Li ........................... G06T 17/05

OTHER PUBLICATIONS

Ni et al. (Vehicle Attribute Recognition by Appearance: Computer Vision Methods for Vehicle Type, Make and Model Classification, published Jun. 26, 2020, pp. 1-12. (Year: 2020).*

European Patent Office; International Search Report and Written Opinion issued in Application No. PCT/US2021/063365; 19 pages; dated Jun. 24, 2022.

European Patent Office; Invitation to Pay Additional Fees issued in Application No. PCT/US2021/063365; 13 pages; dated Apr. 29, 2022.

Summerson, C.; What is Apple CarPlay, and is it Better than Just Using a Phone in Your Car?; How-to Geek; pp. 1-7; Retrieved from the Internet: url:https://www.howtogeek.com/277953/what-is-apple-carplay-and-is-it-better-than-just-using-a-phone-in-your-car/; dated Jul. 12, 2018.

Anonymous; CarPlay App Programming Guide; 50 pages; Retrieved from the internet: url:https://developer.apple.com/carplay/documentation/CarPlay-App-Programming-Guide.pdf; dated Mar. 31, 2021.

Intellectual Property India; Examination Report issued in Application No. 202327015741; 10 pages; dated Nov. 21, 2023.

* cited by examiner

AUTOMATED ASSISTANT THAT DETECTS AND SUPPLEMENTS VARIOUS VEHICLE COMPUTING DEVICE CAPABILITIES

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

Automated assistants can be installed at a variety of different devices such as, for example, mobile phones and personal computers. A user can cause a particular application at a mobile phone or a personal computer to perform a particular action by interacting with a respective automated assistant. However, in circumstances when a user is located in a vehicle, the user may attempt to invoke an automated assistant via their mobile phone, which may not be placed in a location suitable for detecting spoken utterances. For example, a user that places their mobile phone in a cupholder upon entering their vehicle may limit the capabilities of any audio interfaces (e.g., speakers, microphones, etc.) of the mobile phone. As a result, the user may have difficulties invoking the automated assistant via their mobile phone, and therefore may not be able to benefit from automotive-related features.

In some instances, a vehicle may have a dedicated computing device that can connect with a mobile phone of a user via Bluetooth or other wireless communications protocol. In this way, the vehicle computing device can establish communications channels with portable computing devices that a user brings into the vehicle. However, efficiency can vary with respect to vehicle computing devices communicating with a particular mobile device and/or a mobile device application. For example, although a vehicle computing device may provide access to secured applications, executing an authentication process at the vehicle computing device may be duplicative when a user is already verified with a mobile device present in the vehicle. In some instances, a vehicle computing device may include a dedicated display interface for rendering an application interface of any particular application installed at the vehicle computing device. However, the vehicle computing device may impetuously waste computational resources displaying application content that is currently being, or may have already been, rendered at a display interface of a mobile computing device within the vehicle. Alternatively, or additionally, some mobile device applications may not be compatible with certain vehicle computing devices, and in such instances, a user may be limited to a device application interface that is unsafe to view in a vehicle.

SUMMARY

Implementations set forth herein relate to interactions between a vehicle, and/or vehicle computing device, and an automated assistant that is accessible via an ecosystem of client devices (e.g., mobile device, standalone speaker device, standalone display device, etc.). For instance, some implementations herein relate to assistant interactions that occur before a user has entered their vehicle, while the user is in their vehicle, and/or after a user has exited their vehicle. In some implementations, according to a type of vehicle that a user employs, the user can interact with their automated assistant to achieve technical benefits from certain vehicle-related features of the automated assistant. In this way, the automated assistant can adapt to a variety of different vehicle types that may have varying types of vehicle computing devices and/or interfaces. The adaptability of the automated assistant, according to some implementations herein, can achieve increased safety for passengers of a vehicle.

For example, a user that carries their mobile computing device into their vehicle can provide a spoken utterance (e.g., "Navigate to the nearest basketball court.") to an automated assistant to receive navigation instructions. However, depending on the type of vehicle, the vehicle may already include a dedicated vehicle computing device that provides access to an instance of the automated assistant or a different automated assistant. When the vehicle is a first type of vehicle that includes a vehicle computing device that provides access to a vehicle automated assistant, the mobile computing device, and/or the client automated assistant of the mobile computing device, can detect a response from the vehicle automated assistant. Based on the response from the vehicle automated assistant (e.g., "Ok, navigating to the nearest basketball court."), the client automated assistant of the mobile computing device can provide a different response than the response from the vehicle automated assistant. For example, the mobile computing device can, in response to the spoken utterance, render content that supplements the content being rendered by the vehicle automated assistant. In some instances, the client automated assistant can initialize a separate application that can provide, with prior permission from the user, content associated with the navigation instructions requested by the user (e.g., operating hours of the basketball court, social media posts related to the basketball court, calendar data associated with the basketball court, messages that identify the basketball court, etc.).

Alternatively, or additionally, a user that enters a second type of vehicle that does not provide access to the vehicle automated assistant, or an instance of the client automated assistant, may receive a different response when providing an assistant input while riding in the vehicle. For example, when a user provides a spoken utterance such as, "Navigate to the nearest basketball court," while in a vehicle that has no vehicle automated assistant, the client automated assistant can detect a lack of response from any other automated assistant. Alternatively, or additionally, the mobile client device can detect a type of vehicle that the user is currently located in and determine that the vehicle does not have a dedicated vehicle automated assistant. Therefore, in response to the spoken utterance from the user, the client automated assistant can provide an output that is at least partially based on the lack of an additional automated assistant and/or interactive vehicle computing device being present. In some instances, the client automated assistant can provide content that satisfies the request embodied in the spoken utterance (e.g., "Ok, in 100 meters, take a left on Bardstown Road."). In this way, the client automated assistant can adapt to capabilities and functionality of various vehicles in which the user may ride.

In some implementations, a mobile computing device and a vehicle computing device can cooperate to perform certain operations that can allow each respective device to supplement features of the other device. For example, a particular type of vehicle can include a vehicle computing device with a display panel that includes a touch interface. Furthermore, a mobile computing device can include a fingerprint sensor and/or forward-facing camera. When a user provides an assistant input to the vehicle automated assistant for initializing a secured operation, the user can be provided with a request to authenticate with an instance of the automated assistant. For example, and according to a preference of the user, the client automated assistant can solicit the user to perform fingerprint authentication via the fingerprint sensor of the mobile computing device. Therefore, although the vehicle automated assistant received the spoken utterance, the client automated assistant can be invoked in order to assist with authentication of the user.

In some instances, the user may initially have their mobile computing device in a low cup holder of the vehicle, which can hinder detection of certain inputs from the user to the mobile computing device. When the client automated assistant solicits the user to participate in, for example, facial recognition process using the mobile computing device, the user may move the mobile computing device from out of the low cup holder to a higher area on the dashboard. As a result, the client automated assistant can perform facial recognition via a front-facing camera of the mobile computing device, and also more readily detect subsequent inputs without being hindered by the cup holder. In this way, an ability of a vehicle device to leverage operating features of another device in the vehicle can encourage a user to arrange each respective device within their vehicle in a way that improves the functionality of all devices.

In some implementations, the user may prefer facial authentication for initializing certain secured operations over fingerprint authentication. As a result, the vehicle automated assistant can invoke the client automated assistant in order to encourage the user to relocate their mobile computing device to a location that allows the forward-facing camera of the mobile computing device to detect a face of the user. In vehicles that do not include an interior facing camera, or an interior camera that can be reoriented toward a face of the user, the vehicle computing device can be assisted by the available features of the mobile computing device. In some implementations, vehicle-related transactions can be authenticated before the user enters the vehicle, while the user is in the vehicle, and/or after the user has left the vehicle. For example, a vehicle that is shared by multiple persons can include a vehicle computing device that can request to synchronize certain data prior to a particular user entering the vehicle. In order to authenticate the particular user prior to entering the vehicle, the vehicle computing device and/or vehicle automated assistant can invoke a client automated assistant that is accessible via a mobile computing device of that particular user.

As an example, a vehicle can be shared among multiple persons of a household that include a primary user that owns the vehicle and a guest user that borrows the vehicle on weekends. When a vehicle computing device of the vehicle predicts that the guest user may be driving the vehicle during an upcoming time period, the vehicle computing device can communicate with a mobile computing device of the guest user. The communication between the vehicle computing device and the mobile computing device can cause a client automated assistant to solicit the guest user for authorization to synchronize certain features of the mobile computing device with the vehicle computing device. For example, the vehicle computing device can provide access to a podcast application that is also accessible via the mobile computing device. Therefore, the vehicle computing device can solicit the user to approve a synchronization operation associated with each instance of the podcast application and also authenticate themselves in order to ensure that the operation is a secured operation. For instance, the vehicle computing device can cause first content, such as a selectable suggestion (e.g., "Sync podcasts with vehicle") to appear at an interface of the mobile computing device. The guest user can select to confirm the suggestion and, in response, the mobile computing device can solicit the user to perform a biometric authorization (e.g., facial recognition and/or fingerprint scan). In this way, the vehicle computing device can allow for secured operations to be authorized using a biometric interface that may not be available at the vehicle computing device.

Synchronization operations can allow the vehicle to access, with prior permission from a user, destinations and/or locations that one or more computing devices associated with the user have been to. Alternatively, or additionally, synchronization operations can allow a client computing device, with prior permission from the user, to identify other destinations and/or other locations that the vehicle has been to. In some instances, a user can provide authorization, via their mobile computing device, for the vehicle to grant certain permissions to another user or another device. For example, a user that leaves their vehicle at a service shop may eventually need to provide permission for the service shop to access certain features of their vehicle and/or certain data about their vehicle. When the service shop attempts to access a corresponding feature and/or data, a vehicle automated assistant can invoke the client automated assistant at the mobile computing device in order to solicit the user for authorization. In some implementations, the user can authorize the service shop to access certain vehicle features and/or vehicle data by performing a biometric authorization at their client computing device. In some implementations, such authorization operations can be performed before a user has entered their vehicle, while a user is in their vehicle, and/or after a user has left their vehicle.

In some implementations, a client automated assistant and/or other application of a client computing device can detect a type of vehicle that is associated with a particular user. For example, a user that brings their mobile computing device into their vehicle can cause the mobile computing device to detect certain features of the vehicle. By identifying those features, the client automated assistant can determine the type of vehicle that the mobile computing device has been relocated into and retrieve data about the vehicle via one or more sources (e.g., the internet). The client automated assistant can then use this data to answer questions that the user may have about the vehicle. For example, when the user is wanting to determine a type of oil to buy at the store, the user can ask their client automated assistant and, based on the data retrieved by the mobile computing device, the client automated assistant can render an output responsive to the query from the user (e.g., "Your vehicle uses 10 W-30 oil."). In some implementations, the client automated assistant can learn features of the vehicle over time, with prior permission from the user, as the user interacts with the vehicle and/or any vehicle-related applications. For example, an embedding can be generated based on various sources of data (e.g., a car insurance application, images of a vehicle, maintenance indicators, etc.), and the embedding can be mapped to a latent space. The client automated assistant can then identify a shortest embedding distance between the embedding and another embedding corresponding to a particular vehicle. This particular vehicle can then be identified as the vehicle in which the user has placed their mobile computing device.

Alternatively, or additionally, the mobile computing device can adapt to certain vehicle and/or driving circumstances in order to promote safety of the user and/or operational efficiency. For example, when the automated assistant determines that the user is riding in a vehicle, the automated assistant can suppress certain notifications considered to be less urgent and/or less important than other notifications that may be available to the user. Alternatively, or additionally, the automated assistant, while a user is riding in a vehicle, can detect keyboard usage at the mobile computing device and, with prior permission from the user, initialize dictation over the keyboard in order to encourage voice dictation of text instead of keyboard usage. Alternatively, or additionally, the automated assistant can initialize a driving-optimized user interface at the mobile computing device, a selectable dictation icon, a selectable settings icon for modifying driving settings (e.g., enabling larger text, screen dictation, etc.).

In some implementations, the client automated assistant can put the user on notice of certain information about their vehicle, even when the vehicle does not have a dedicated vehicle automated assistant and/or a vehicle computing device that the client automated assistant can communicate with. For example, the client automated assistant can employ one or more trained machine learning models and/or one or more heuristic processes to provide vehicle information to a user before a user is in a vehicle, while a user is in a vehicle, and after a user has left their vehicle. In some instances, when a user mounts their mobile computing device in their vehicle, a rear-facing camera of the mobile computing device can, with prior permission from the user, capture one or more images of a dashboard display of the vehicle. The dashboard can display a variety of different maintenance indicator lights that can put the user on notice of certain issues with the vehicle. In some implementations, an image of the dashboard display and/or other vehicle data can be processed using one or more trained machine learning models in order to generate notifications for the user about their vehicle. For example, the dashboard display can include an illuminated icon that represents a "low coolant" state of the vehicle. An image that captures this illuminated icon can be processed in order for the client automated assistant to generate a vehicle notification for the user in certain contexts (e.g., before the user is expected to enter the vehicle, the client automated assistant can render an audible output such as, "I noticed that the coolant in your 1972 Bronko is low."). In some implementations, other data detected via one or more interfaces of the mobile computing device can also be used to generate vehicle-related notifications for the user before a drive, during a drive, and/or after a drive.

For example, the vehicle may intentionally or unintentionally provide certain audible or inaudible (e.g., over 20,000 Hz) sounds that can be detected by the client automated assistant. Audio data capturing these sounds (e.g., a "low fuel" chime, a squeaky break pad, etc.) can be processed using one or more trained machine learning models and/or one or more heuristic processes in order to generate vehicle-related notifications. For example, a brake with a depleted pad may output audio above an audible frequency that can be detected by a human. However, the client automated assistant can process this sound using a trained machine learning model that has been trained to categorize certain vehicle sounds. As a result, the client automated assistant can provide an output based on the processing in order to generate a notification (e.g., "I noticed you need to replace your brake pads."), even though the vehicle does not have a dedicated vehicle automated assistant that is able to do so. Alternatively, or additionally, the client automated assistant can communicate vehicle-related data to other applications (e.g., a shopping application) in order to reduce a number of manual steps (e.g., ordering replacement brake pads) the user may need to take in order to complete certain maintenance tasks for their vehicle.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
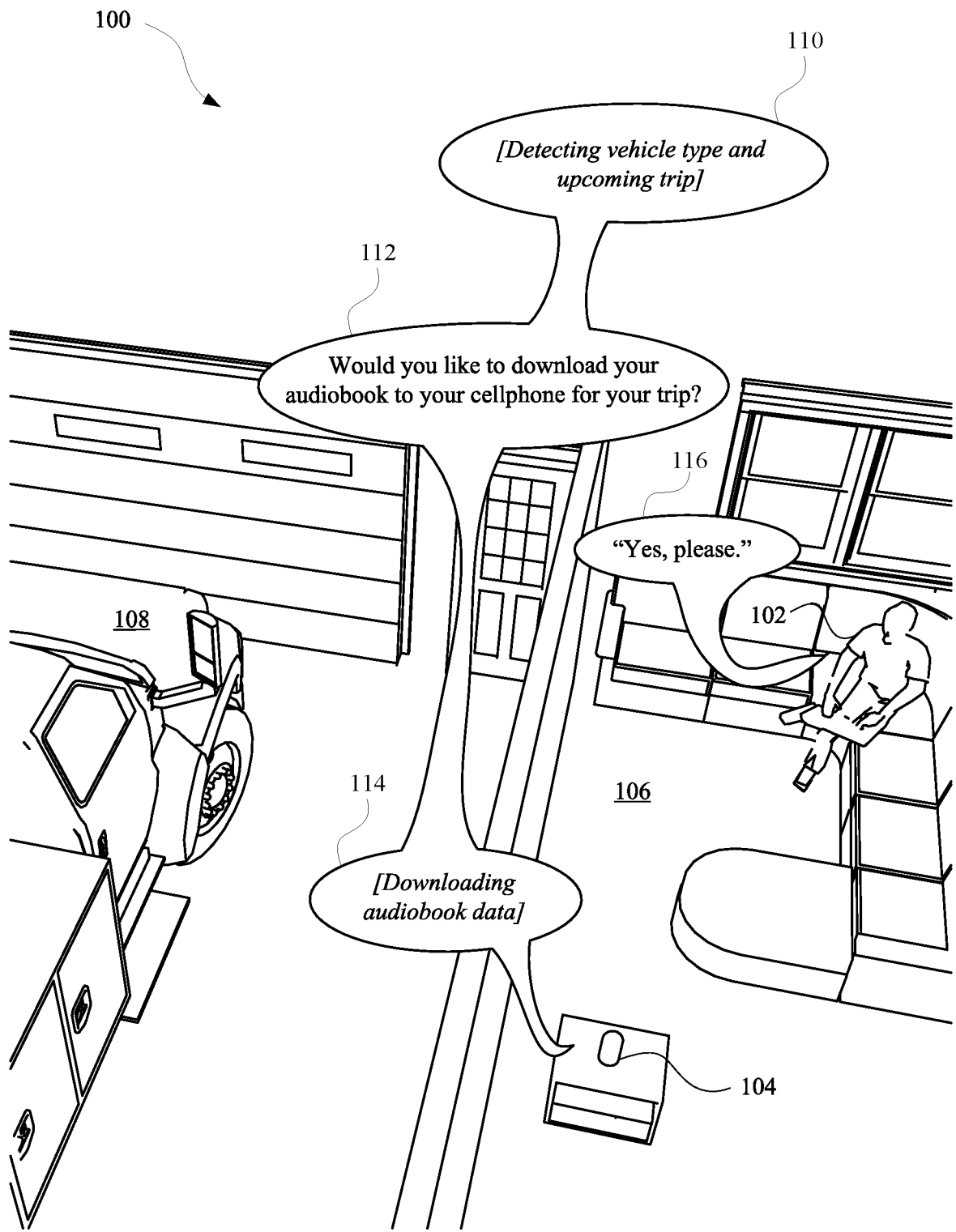
FIG. 1A, FIG. 1B, FIG. 1C, and FIG. 1D illustrate views of a user interacting with a client automated assistant that can adapt to various types of vehicles and/or vehicle capabilities.
Figure 1B:
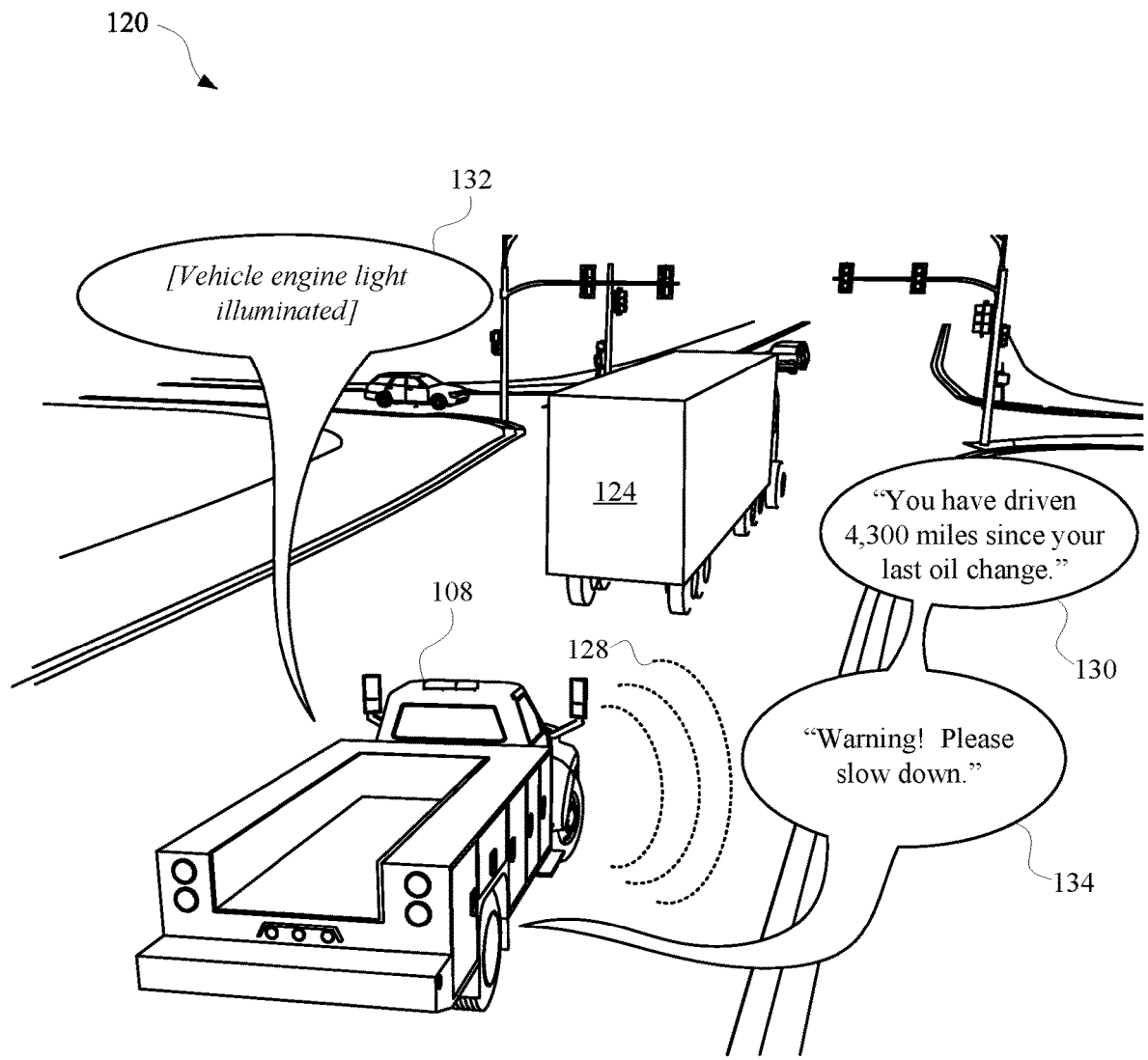
Figure 1C:
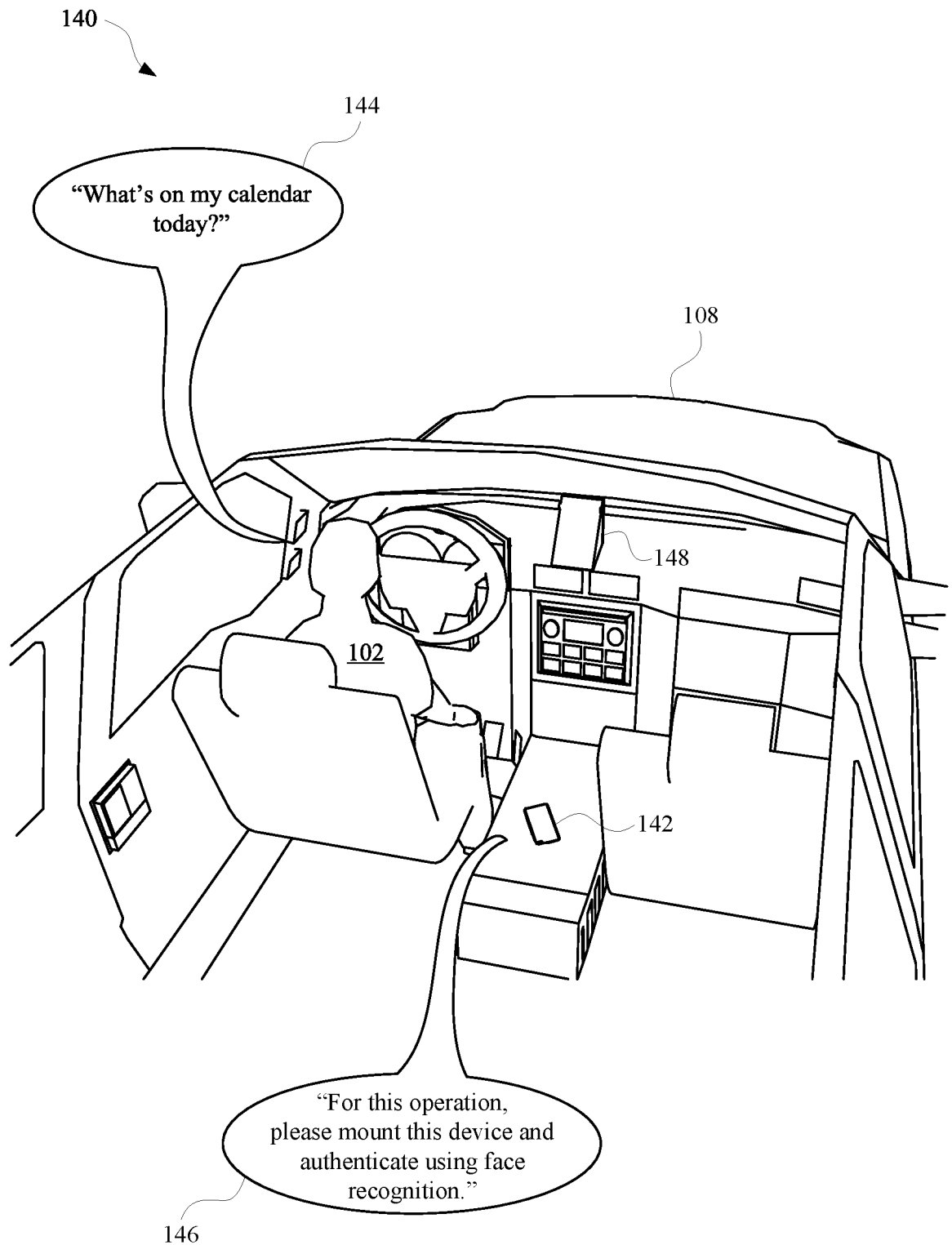

FIG. 1A, FIG. 1B, FIG. 1C, and FIG. 1D illustrates a view 100, a view 120, a view 140, a view 160, and a view 180 of a user 102 interacting with a client automated assistant that can adapt to various types of vehicles and/or vehicle capabilities. For example, in some implementations a user 102 can employ an ecosystem of assistant-enabled devices, such as a standalone speaker device 104, a cellular phone, and/or any other device that can provide access to an automated assistant. Although the user 102 can also have a vehicle 108, the vehicle 108 may not have a dedicated vehicle computing device that the user 102 can interact with in order to access an automated assistant and/or one or more other applications. Regardless, one or more devices in the ecosystem of assistant-enabled devices can detect a type of vehicle corresponding to the vehicle 108 of the user 102 in order to provide vehicle related assistant features.

For example, the standalone speaker device 104 can process, with prior permission from the user 102, data that indicates a work routine of the user 102. Alternatively, or additionally, the standalone speaker device 104 can process, with prior permission from the user 102, data that characterizes a type of vehicle that the user 102 employs to get to their job. Based on this data processing, the automated assistant can determine that the type of vehicle 108 corresponds to a vehicle that does not include an interactive computing device that provides access to an automated assistant and/or multiple different applications. The automated assistant can then use this information to suggest that the user 102 utilizes vehicle-related features of the automated assistant.

For example, the automated assistant can perform an operation 110 of detecting a vehicle type of the vehicle 108 and determining whether the user 102 is going on an upcoming trip. Based on the automated assistant detecting that the vehicle 108 has limited functionality, the automated assistant can render an output 112 for the user 102 such as, "Would you like to download your audiobook to your cellphone for your trip?" In response, the user 102 can provide a spoken utterance 116 to the standalone speaker device 104 such as, "Yes, please." Based on this spoken utterance 116 from the user 102, the automated assistant can perform an operation 114 of downloading the audiobook data. This operation 114 can be performed while the user 102 is in their home 106 and prior to the user 102 entering their vehicle 108 to begin their trip to work.

In some implementations, when the user 102 brings a mobile computing device into the vehicle 108 during a trip, the automated assistant can perform certain operations in order to enable vehicle-related features for the user 102. For example, and as provided in view 120 of FIG. 1B, the automated assistant can perform an operation of detecting a type of vehicle that the user 102 has brought their mobile computing device into. When the automated assistant determines that the vehicle 108 is a type of vehicle that does not include an integrated and interactive computing device, the automated assistant can process other data to provide vehicle-related features for the user 102. For example, the automated assistant can perform an operation 132 of identifying, using a camera of the mobile computing device, a vehicle engine light that is illuminated at a dashboard of the vehicle 108. Using this information, the automated assistant can process data that is related to the vehicle engine light in order to provide additional information that can assist the user 102 with resolving an issue corresponding to the vehicle engine light.

In some implementations, the automated assistant can, with prior permission from the user, have access to application data that the user 102 has accessed, in order to provide information that can supplement any indications from the vehicle 108. For example, the user 102 may have previously accessed an application associated with a maintenance shop that the user previously contracted to perform an oil change on their vehicle 108. In some instances, the application data can indicate a mileage of the vehicle 108 when the last oil change was performed. Using this information, and an image of the dashboard with the engine light (e.g., an oil change light) illuminated, the automated assistant can render an output 130 such as, "You have driven 4,300 miles since your last oil change."

Alternatively, or additionally, the mobile computing device can detect one or more types of sounds 128 being intentionally or unintentionally generated by one or more operations of the vehicle 108. For example, and as indicated in view 120 of FIG. 1B, the automated assistant can detect the sound 128 via one or more interfaces of the mobile computing device. The automated assistant can determine, using one or more heuristic processes and/or trained machine learning models, that the sound 128 corresponds to the sound of acceleration. Based on this determination, and one or more images captured of a street 126 and/or other vehicle 124 in front of the vehicle 108, the automated assistant can render a warning output 134 (e.g., "Warning! Please slow down."). In this way, even though the vehicle 108 does not include a dedicated vehicle automated assistant, the user 102 can still benefit from supplemental information generated by the client automated assistant.

In some instances, the user 102 can be operating the vehicle 108 with their mobile computing device 142 residing at a location within the vehicle 108 that is not optimized for detecting inputs from the user 102 and/or features of the vehicle 108. In order to encourage the user 102 to set the mobile computing device 142 in a more suitable location for operating each respective interface of the mobile computing device 142, the automated assistant can provide certain output. For example, the user 102 can provide a spoken utterance 144 such as, "What's on my calendar?" In response to the spoken utterance, the automated assistant can provide an output that is responsive to the spoken utterance and encourages the user 102 to relocate their device to a more suitable location (e.g., a device holder 148). The output 146 from the automated assistant can be, for example, "For this operation, please mount this device and authenticate using face recognition." In this way, the output 146 generated by the automated assistant can be based on the spoken utterance, the location of the mobile computing device 142 within the vehicle 108, and a type of vehicle as determined by the automated assistant associated with the mobile computing device 142.

Figure 1D:
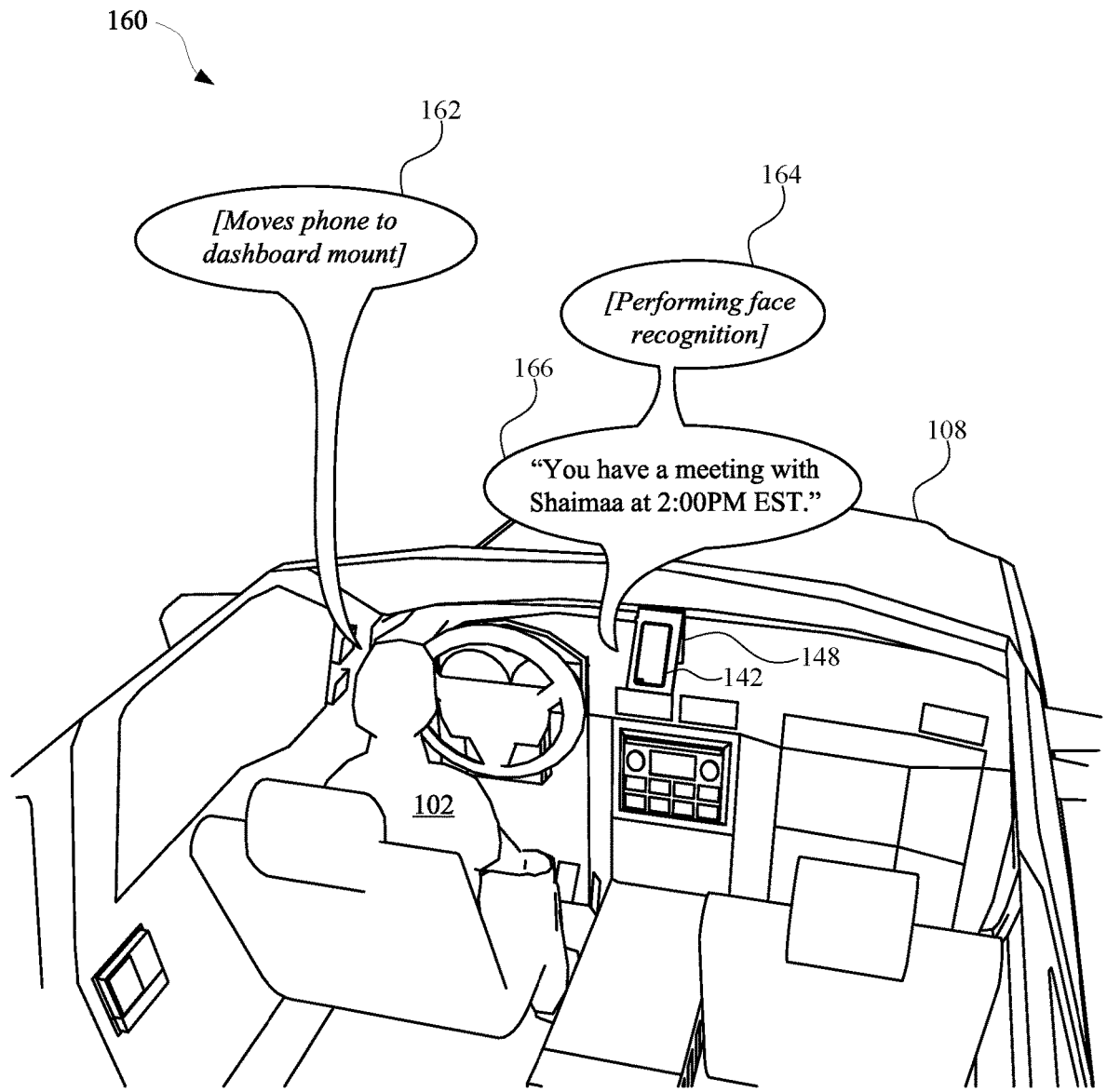

In response to the output 146, the user 102 can maneuver their mobile computing device 142 to the device holder 148, as indicated in operation 162 of FIG. 1D. When the mobile computing device 142 is mounted in the device holder 148, the automated assistant can, with prior permission from the user 102, access graphical data generated by a forward-facing camera of the mobile computing device 142. Based on this graphical data, the automated assistant can determine that the mobile computing device 142 is mounted in a more suitable location for receiving inputs from the user 102 and/or detecting features of the vehicle 108. Alternatively, or additionally, the automated assistant can perform face recognition, as indicated in operation 164. When the face recognition is completed successfully in the vehicle 108, the automated assistant can initialize performance of one or more operations requested by the user 102. For example, in response to the spoken utterance 144, the automated assistant can authenticate the user 102 and then provide an output 166 such as, "You have a meeting with Shaimaa at 2:00 PM EST."

Figure 2:
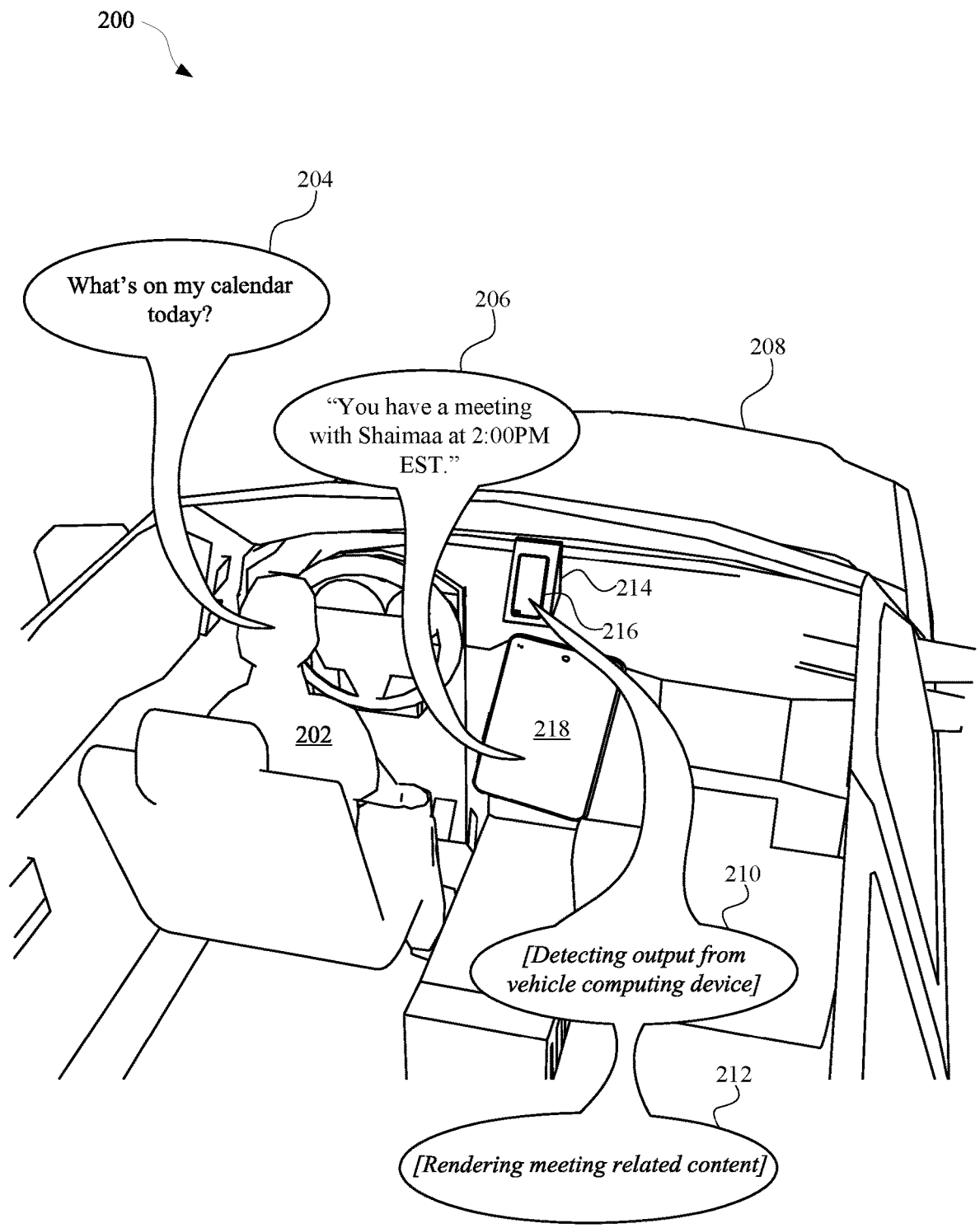
FIG. 2 illustrates a view of a user invoking, while in a vehicle, an automated assistant that adapts to various different vehicle types that can include various computing device capabilities.

FIG. 2 illustrates a view 200 of a user 202 invoking, while in a vehicle 208, an automated assistant that adapts to various different vehicle types, and each vehicle type can include a degree of computing device capabilities. For example, the user 202 can enter a vehicle 208 with their mobile computing device 216, and mount the mobile computing device 216 on a device holder 214. When the mobile computing device 216 is positioned on the device holder 214, the mobile computing device 216 can identify one or more features of the vehicle 208 in order to determine a type of vehicle that corresponds to the vehicle 208. For example, the user 202 can provide a spoken utterance 204 to a vehicle automated assistant, which can provide an output that can be detected by the mobile computing device 216. The spoken utterance 204 can be, for example, "What's on my calendar today?", which can cause a vehicle computing device 218 of the vehicle 208 to provide a responsive output 206 such as, "You have a meeting with Shaimaa at 2:00 PM EST."

The mobile computing device 216 can perform an operation 210 of detecting this audible output via an audio interface of the mobile computing device 216. Based on detecting the responsive output 206, a client automated assistant that is accessible via the mobile computing device 216 can determine a type of vehicle corresponding to the vehicle 208. For example, the type of vehicle can be one that includes a vehicle computing device 218 that provides access to one or more different applications and/or a vehicle automated assistant. Based on this determination, the automated assistant can generate content that supplements the output from the vehicle automated assistant. For example, the client automated assistant can perform an operation 212 of rendering meeting related content, based on the natural language content (e.g., "meeting with Shaimaa at 2:00 PM EST") embodied in the responsive output 206 from the vehicle automated assistant. The related content can be generated based on a comparison between the natural language content embodied in the responsive output 206 and application data that is accessible to the automated assistant. For example, the client automated assistant can render a map of a location for the meeting using location data retrieved by the client automated assistant from a calendar application associated with the user 202.

Figure 3:
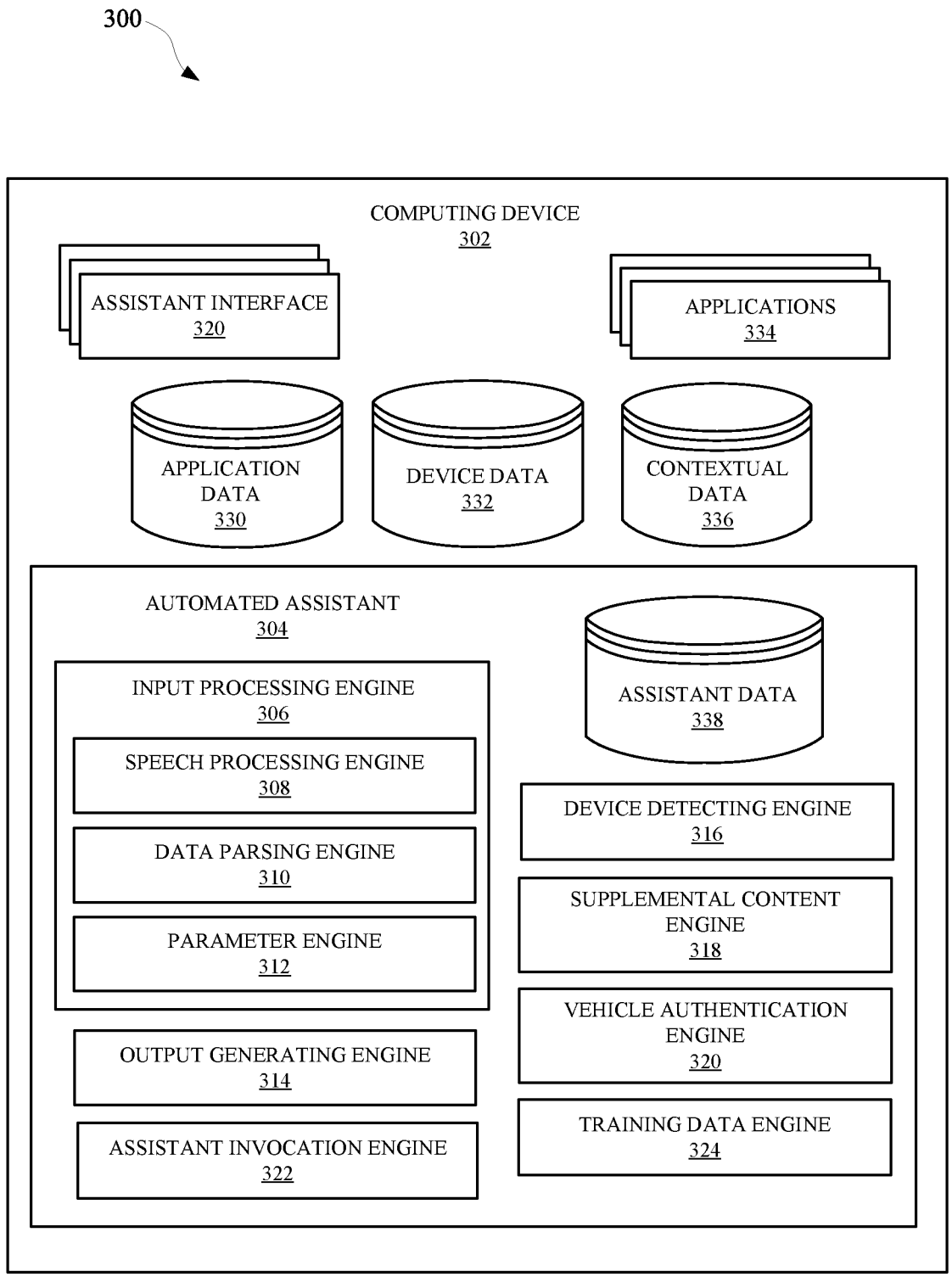
FIG. 3 illustrates a system that provides access to an automated assistant that can adapt to various types of vehicles and/or vehicle capabilities.

FIG. 3 illustrates a system 300 that provides access to an automated assistant that can adapt to various types of vehicles and/or vehicle capabilities. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, vehicle, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, interact with a vehicle, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the Internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device. In this way, when the computing device 302 is detecting an assistant suppressing output, the automated assistant 304 will not be invoked based on contextual data 336—which would otherwise cause the automated assistant 304 to be invoked if the assistant suppressing output was not being detected.

In some implementations, the automated assistant 304 can optionally include a device detecting engine 316 that can be used to process application data 330, device data 332, and/or contextual data 336 in order to determine whether another device is present in an environment. For example, the device data 332 and/or contextual data 336 can include data captured using one or more sensors of the computing device 302. This data can characterize one or more connections between the computing device 302 and one or more devices, and/or one or more networks. Based on this data, the computing device 302 can determine that another assistant-enabled device, or non-assistant-enabled device, is present in an environment with the computing device 302. Additionally, or alternatively, contextual data 336 can be processed by the device detecting engine 316 to determine, with prior permission from a user, whether another device is present in the environment based on any output from another device. For example, the contextual data 336 can include data that is captured using one or more sensors of the computing device 302. The sensors can be used to detect audio (e.g., vehicle maintenance chime), graphical, wireless, and/or haptic output (e.g., a vehicle engine) from another device. The device detecting engine 316 can use this determination regarding the presence of another device to cause the computing device 302 to enable features that can supplement and/or enhance features of the other device.

In some implementations, the device detecting engine 316 can process data that includes images, audio data, wireless data, and/or any other data in order to identify a type of vehicle that a user may access. For example, and with prior permission from a user, the automated assistant 304 can access data that characterizes interior features of a vehicle such as, but not limited to, maintenance indicators, lights, motor sounds, brake sounds, interior layout, in-dash display, and/or any other features of a vehicle. The data can be processed using one or more trained machine learning models and/or one or more heuristic processes in order to identify a vehicle make and model corresponding to the features characterized by the data. When the vehicle make and model has been identified, the automated assistant 304 can access one or more sources of vehicle data over a network (e.g., the internet) in order to identify technical data about capabilities of the vehicle. Based on this technical data, the automated assistant can determine whether the vehicle provides access to certain features such as, but not limited to, a vehicle automated assistant, an interactive computing device that provides access to one or more different applications, one or more different types of applications, computer interfaces, and/or any other features that can be relevant to an automated assistant.

In some implementations, vehicle features identified by the device detecting engine 316 can be communicated to a supplemented content engine 318. The supplemental content engine 318 can generate content for a user based on vehicle features that have been detected and/or any other data detected at one or more assistant interfaces 320. For example, the supplemental content engine 318 can determine that a vehicle includes an interactive computing device and a vehicle automated assistant. Alternatively, or additionally, the supplemental content engine 318 can determine that the user is receiving navigation instructions from the vehicle automated assistant. Based on this determination and the navigation instructions, the supplemental content engine 318 can generate content using one or more sources of data (e.g., application data 330, internet source(s)) in order to generate content that is different from the navigation instructions. For example, the supplemental content engine 318 can generate content regarding calendar events that may be occurring when a user arrives at their destination. Alternatively, or additionally, when the supplemental content engine 318 determines that the vehicle does not have a vehicle automated assistant, the supplemental content engine 318 can generate content that includes suggestions for where to navigate and/or suggestions for vehicle maintenance.

In some implementations, the system 300 can include a vehicle authentication engine 320, which can communicate with an available vehicle computing device, and/or an entity associated with a vehicle, in order to authenticate the user for certain secured operations. For example, the vehicle can include one or more applications that have access to data (e.g., insurance data) that may be important for a service provider (e.g., an auto mechanic). When the service provider attempts to access the data, a vehicle application can provide a communication to the vehicle authentication engine 320, which can process the communication. The communication can include a request for the user to authenticate with the computing device 302 in order to grant the service provider access to certain vehicle application data. When the user elects to authenticate in response to the communication, the computing device 302 can communicate with the vehicle, which can then grant access to the service provider based on the user authentication.

In some implementations, the automated assistant 304 can optionally include a training data engine 324 for generating training data, with prior permission from the user, based on interactions between the automated assistant 304, a user, and/or a vehicle. In some implementations, the training data engine 324 can generate training data in furtherance of enhancing a model that can be used to identify a vehicle and/or features of a vehicle. For example, the training data engine 324 can generate training data that provides a correlation between certain interior features of a vehicle (with prior permission from a vehicle owner) and certain computer-related features of the vehicle. In this way, one or more trained machine learning models can be further trained in order that each instance of the automated assistant 304 can employ a trained machine learning model to better assist the user when they are riding in various types of vehicles.

Figure 4:
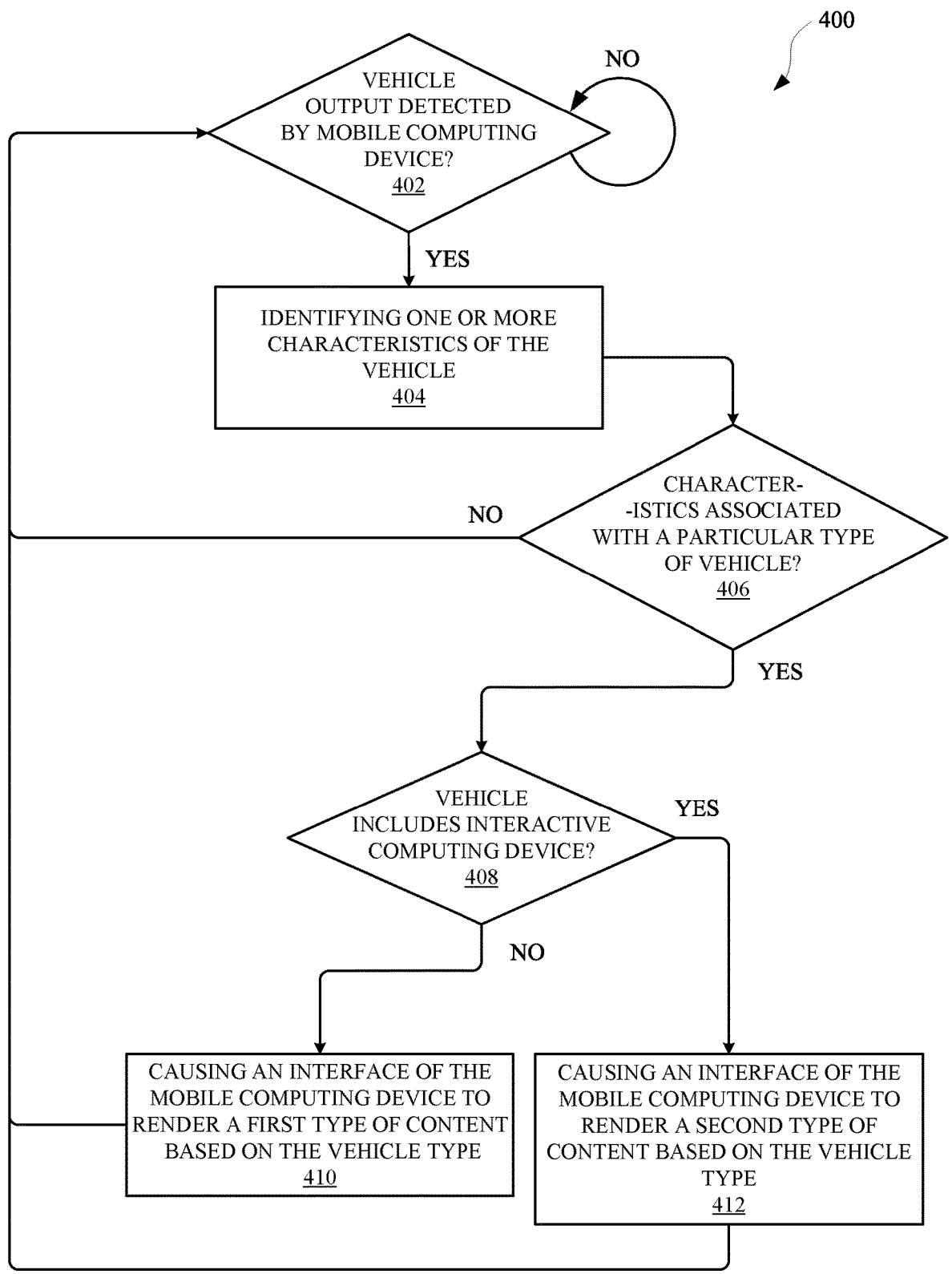
FIG. 4 illustrates a method for detecting a type of vehicle into which a mobile computing device has been placed, and rendering content for a user based on the type of vehicle.

FIG. 4 illustrates a method 400 for detecting a type of vehicle into which a mobile computing device has been placed, and rendering content for a user based on the type of vehicle. The method 400 can be performed by one or more applications, devices, and/or apparatus or module capable of interacting with an automated assistant. The method 400 can include an operation 402 of determining whether a vehicle output has been detected by the mobile computing device. In some implementations, the vehicle output can be an output from a vehicle or a vehicle computing device that is integral to the vehicle in which the mobile computing device is located. For example, the vehicle can include a display interface that the user can interact with in order to control the vehicle computing device via touch input. As the vehicle computing device performs operations, the vehicle computing device can provide an output that is detectable by the mobile computing device. Alternatively, or additionally, the vehicle can be void of a dedicated vehicle automated assistant for interacting with a user and that is associated with the vehicle. Alternatively, or additionally, the vehicle can be void of a dedicated vehicle computing device that includes a graphical user interface for controlling various applications installed at the vehicle computing device.

When such a vehicle automated assistant and/or a vehicle computing device are not available at the vehicle, the mobile computing device can detect certain characteristics of the vehicle. For example, the particular type of vehicle corresponding to the vehicle that the mobile computing device is located in can include a variety of different visual features and/or provide a variety of signals and audio. In some instances, a dashboard with visual indicators can be protected by a camera of the mobile computing device. Alternatively, or additionally, various different sounds coming from the vehicle can be detected by one or more audio interfaces of the mobile computing device. Alternatively, or additionally, various different electrical signals and/or wireless signals can be detected through one or more computer interfaces of the mobile computing device.

Based on what is detected by the mobile computing device, a client automated assistant and/or the mobile computing device can perform an operation 404 of identifying one or more characteristics of the vehicle. In some implementations, the one or more characteristics of the vehicle can indicate an ability of the vehicle to provide access to an automated assistant. Alternatively, or additionally, the one or more characteristics can indicate whether the vehicle has a dedicated vehicle computing device for the user to interact with in order to access one or more different applications. Alternatively, or additionally, the one or more characteristics can indicate a type of vehicle and where the mobile computing device is located and/or a make and model of the vehicle. In this way, the client automated assistant of the mobile computing device can determine an interior layout of the vehicle, an exterior design of the vehicle, features of electronics integral to the vehicle, an environment in which the vehicle is located, and/or any other characteristics that can be used by the client automated assistant to provide vehicle-related information to the user.

The method 400 can proceed from the operation 404 to an operation 406, which can include determining whether the identified characteristics are associated with a particular type of vehicle. In some implementations, a heuristic process and/or one or more trained machine learning models can be used to process the characteristics and identify the type of vehicle. For example, the one or more characteristics can be processed in order to generate an embedding that can be mapped into latent space. A relative distance of the embedding to one or more other embeddings representing types of vehicles can indicate a likelihood that this particular vehicle is a certain type of vehicle. When the one or more characteristics do not indicate that the mobile computing device is being associated with a particular type of vehicle, the method 400 can return to the operation 402, or the operation 404 for identifying other characteristics. Otherwise, when one or more characteristics are determined to be associated with a particular type of vehicle, the method 400 can proceed from the operation 406 to an operation 408.

The operation 408 can include determining (e.g., based on a make and model of the vehicle) whether the type of vehicle is one that includes an interactive computing device, or a computing device that provides access to multiple different applications. When the vehicle is determined to have an interactive computing device, the client automated system can operate according to the assumption that the vehicle is able to provide certain responses to user input. For example, when a vehicle is determined to have a dedicated vehicle automated assistant based on audio output from the vehicle automated assistant, the client automated assistant at the mobile computing device can provide content that supplements what is being provided by the vehicle automated assistant. In some implementations, the client automated assistant and the vehicle automated assistant can provide different content without communicating with each other directly and/or intentionally. For example, the user can request navigation instructions from the vehicle automated assistant by providing a spoken utterance (e.g., "Navigate to the nearest dog park."). When the user is in their vehicle with a mobile computing device, the client automated assistant can determine the type of vehicle that the user is in, to provide a responsive output based on the type of vehicle. For example, a vehicle that is determined to have a vehicle assistant can provide the navigation instructions in response to the spoken utterance. Concurrently, the mobile computing device can render an output that supplements the navigation instructions being provided by the vehicle computing device (e.g., Suggestions for nearby pet stores).

When the type of vehicle is determined to not include an interactive computing device, the method 400 can proceed from the operation 408 to an operation 410 of causing an interface at the mobile computing device to render a first type of content based on the vehicle type. When the type of vehicle is determined to include an interactive computing device, the method 400 can proceed to an operation 412 of causing the interface of the mobile computing device to render a second type of content based on the vehicle type. For example, when navigation instructions are requested from the user, and the vehicle does not have an interactive computing device, the client automated assistant can provide a graphical rendering of first content, such as but not limited to the navigation instructions. However, when navigation instructions are requested by the user, and the vehicle does have an interactive computing device, the client automated assistant can provide second content, such as but not limited to selectable suggestions associated with a destination that the user requested.

Figure 5:
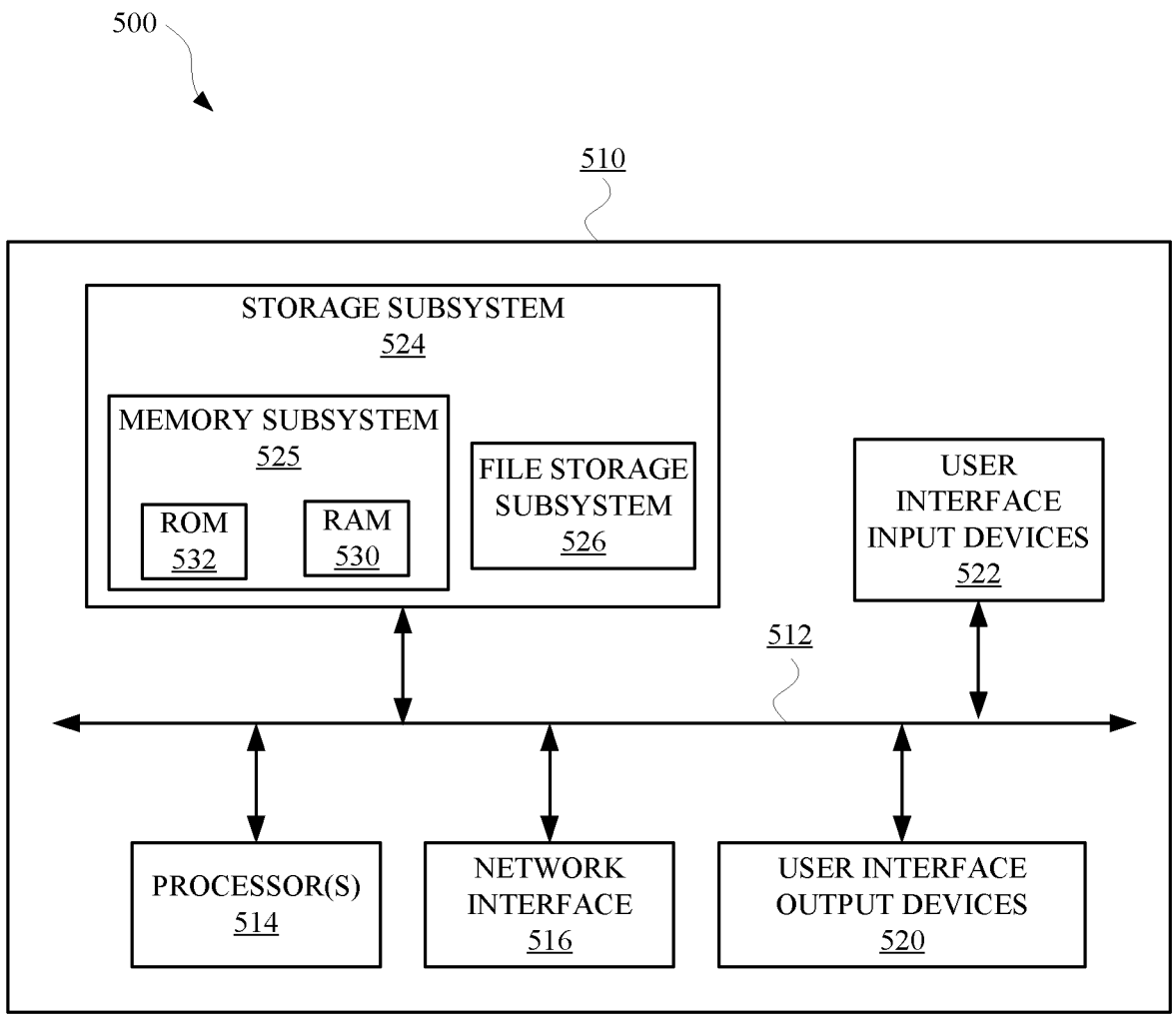
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, mobile computing device 142, standalone speaker device 104, vehicle 108, vehicle computing device 218, mobile computing device 216, vehicle 208, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at a mobile computing device, a request for an automated assistant to provide navigation instructions to a user while the user is in a vehicle, wherein the request is embodied in a spoken utterance that is detected at an audio interface of the mobile computing device. The method can further include an operation of identifying, by the mobile computing device, one or more features of the vehicle using one or more interfaces of the mobile computing device, wherein the one or more features indicate an ability of a vehicle computing device to render the navigation instructions. The method can further include an operation of determining, based on the one or more features, a type of vehicle in which the mobile computing device is located. The method can further include an operation of, when the type of vehicle is a first type of vehicle: causing, in response to the request to provide the navigation instructions, a display interface of the mobile computing device to render one or more selectable suggestions associated with the navigation instructions, wherein the vehicle computing device renders the navigation instructions simultaneous to the mobile computing device rendering the one or more selectable suggestions. The method can further include an operation of, when the type of vehicle is a second type of vehicle: causing, in response to the request to provide the navigation instructions, the display interface of the mobile computing device to render navigation data corresponding to the navigation instructions.

In some implementations, determining the type of vehicle in which the mobile computing device is located includes: determining whether vehicle computing device provides access to an instance of the automated assistant, or a separate automated assistant, that is capable of providing the navigation instructions, wherein the first type of vehicle provides access to the instance of the automated assistant or the separate automated assistant. In some implementations, identifying the one or more features of the vehicle using the one or more interfaces of the mobile computing device includes: determining whether the instance of the automated assistant or the separate automated assistant provided an audible output that is responsive to the spoken utterance provided by the user. In some implementations, determining the type of vehicle in which the mobile computing device is located includes: determining whether the vehicle computing device includes a display interface for rendering graphical navigation instructions for the user, wherein the first type of vehicle provides access to the display interface for rendering the graphical navigation instructions.

In some implementations, the method can further include an operation of, when the type of vehicle is a first type of vehicle: causing the display interface of the vehicle computing device to render the graphical navigation instructions simultaneous to the mobile computing device rendering the one or more selectable suggestions associated with the navigation instructions. In some implementations, determining whether the vehicle computing device includes the display interface for rendering graphical navigation instructions for the user includes: processing image data generated using one or more cameras of the mobile computing device, wherein the image data characterizes an area within the vehicle that includes at least a portion of the display interface.

In yet other implementations, a method implemented by one or more processors is set forth as including operations such as determining, by a vehicle computing device, that a mobile computing device is located in a vehicle, wherein each of the mobile computing device and the vehicle computing device separately provide access to a respective instance of an automated assistant. The method can further include an operation of receiving, at the vehicle computing device, a spoken utterance that is directed to one or more instances of the automated assistant, wherein the spoken utterance solicits the automated assistant to initialize an operation that is secured via user authentication. The method can further include an operation of causing, based on the spoken utterance, the mobile computing device to render a request for the user to participate in a user authentication process, wherein the mobile computing device includes one or more interfaces for receiving one or more biometric inputs during the user authentication process. The method can further include an operation of causing, based on the spoken utterance, the mobile computing device to process a biometric input received at the one or more interfaces of the mobile computing device while the mobile computing device is located in the vehicle, wherein the biometric input characterizes one or more biometric features of the user. The method can further include an operation of determining, based on the user providing the biometric input, that the mobile computing device, or the automated assistant, authenticated the user based on the one or more biometric features of the user. The method can further include an operation of causing, based on the spoken utterance from the user, the automated assistant to initialize performance of the operation at the vehicle computing device.

In some implementations, causing the mobile computing device to render the request for the user to participate in the user authentication process includes: causing the mobile computing device to provide another request for the user to reposition the mobile computing device inside the vehicle in furtherance of completing the authentication process. In some implementations, causing the mobile computing device to process the biometric input includes: causing the mobile computing device to process one or more images captured by a camera of the mobile computing device, wherein the authentication process is a face recognition process. In some implementations, causing the automated assistant to initialize performance of the operation at the vehicle computing device includes: causing first content to be rendered at a display interface of the mobile computing device, and causing second content, that is different than the first content, to be simultaneously rendered at a separate display interface of the vehicle computing device. In some implementations, causing the automated assistant to initialize performance of the operation at the vehicle computing device includes: causing, based on the user providing the biometric input, the vehicle computing device to communicate data generated at the vehicle computing device to a separate computing device that is different from the mobile computing device and the vehicle computing device. In some implementations, the data is based on one or more operations performed by the vehicle over a duration of time, and the separate computing device is in communication with multiple different vehicle computing devices that include the vehicle computing device.

In some implementations, a method implemented by one or more processors is set forth as including operations such as determining, at an automated assistant operating on a mobile computing device located in a vehicle, one or more characteristics of output being rendered by a vehicle, wherein the vehicle includes a vehicle computing device that is separate from the mobile computing device. The method can further include an operation of identifying, by the mobile computing device, one or more features of the vehicle based on the one or more characteristics of the output, wherein the one or more features are detected using one or more interfaces of the mobile computing device. The method can further include an operation of determining, based on the one or more features, a type of the vehicle in which the mobile computing device is located. The method can further include an operation of, when the type of the vehicle is a first type of vehicle: causing, based on the output being rendered by the vehicle, a display interface of the mobile computing device to render a first type of graphical output without rendering of a second type of graphical output. The method can further include an operation of, when the type of vehicle is a second type: causing, based on the output being rendered by the vehicle, the display interface of the mobile computing device to render the second type of graphical output without rendering of the first type of graphical output.

In some implementations, the first type of graphical output includes a graphical rendering of a map that characterizes a location of the vehicle, and the second type of graphical output includes one or more selectable suggestions associated with the location of the vehicle. In some implementations, identifying the one or more features of the vehicle based on the one or more characteristics of the output includes: processing image data captured by a camera of the mobile computing device, wherein the image data characterizes an interior of the vehicle. In some implementations, determining the type of the vehicle in which the mobile computing device is located includes: determining whether the image data includes an image of a computer display interface located in the interior of the vehicle and separate from the mobile computing device. In some implementations, the output being rendered by the vehicle corresponds to a maintenance indicator that provides an indication of an issue with the vehicle, and the first type of graphical output includes one or more selectable suggestions that are based on the issue with the vehicle.

In some implementations, the second type of graphical output includes graphical content that characterizes instructions for resolving the issue with the vehicle. In some implementations, determining the type of the vehicle in which the mobile computing device is located includes: processing, using one or more trained machine learning models, image data that includes one or more images of the output of the vehicle, wherein the output includes light from one or more sources of light in the vehicle, and the one or more trained machine learning models are trained using training data that characterizes interior features of a variety of different vehicles. In some implementations, causing the display interface of the mobile computing device to render the first type of graphical output without rendering of a second type of graphical output includes: causing a client automated assistant of the mobile computing device to initialize an application that is not accessible via the vehicle computing device of the first type of vehicle.

We claim:

1. A method implemented by one or more processors, the method comprising:
    determining, at an automated assistant operating on a mobile computing device located in a vehicle, one or more characteristics of output being rendered by a vehicle,
        wherein the vehicle includes a vehicle computing device that is separate from the mobile computing device;
    identifying, by the mobile computing device, one or more features of the vehicle based on the one or more characteristics of the output,
        wherein the one or more features are detected using one or more interfaces of the mobile computing device;
    determining, based on the one or more features, a type of the vehicle in which the mobile computing device is located;
    when the type of the vehicle is a first type of vehicle:
        causing, based on the output being rendered by the vehicle, a display interface of the mobile computing device to render a first type of graphical output without rendering of a second type of graphical output; and
    when the type of vehicle is a second type:
        causing, based on the output being rendered by the vehicle, the display interface of the mobile computing device to render the second type of graphical output without rendering of the first type of graphical output.

2. The method of claim 1, wherein the first type of graphical output includes a graphical rendering of a map that characterizes a location of the vehicle, and the second type of graphical output includes one or more selectable suggestions associated with the location of the vehicle.

3. The method of claim 1, wherein identifying the one or more features of the vehicle based on the one or more characteristics of the output includes:
    processing image data captured by a camera of the mobile computing device,
        wherein the image data characterizes an interior of the vehicle.

4. The method of claim 3, wherein determining the type of the vehicle in which the mobile computing device is located includes:
    determining whether the image data includes an image of a computer display interface located in the interior of the vehicle and separate from the mobile computing device.

5. The method of claim 1,
    wherein the output being rendered by the vehicle corresponds to a maintenance indicator that provides an indication of an issue with the vehicle, and
    wherein the first type of graphical output includes one or more selectable suggestions that are based on the issue with the vehicle.

6. The method of claim 5, wherein the second type of graphical output includes graphical content that characterizes instructions for resolving the issue with the vehicle.

7. The method of claim 1, wherein determining the type of the vehicle in which the mobile computing device is located includes:
    processing, using one or more trained machine learning models, image data that includes one or more images of the output of the vehicle,
        wherein the output includes light from one or more sources of light in the vehicle, and the one or more trained machine learning models are trained using training data that characterizes interior features of a variety of different vehicles.

8. The method of claim 1, wherein causing the display interface of the mobile computing device to render the first type of graphical output without rendering of a second type of graphical output includes:
    causing a client automated assistant of the mobile computing device to initialize an application that is not accessible via the vehicle computing device of the first type of vehicle.

9. A mobile computing device, comprising:
    memory storing instructions;
    one or more processors operable to execute the instructions to:
    determine, while the mobile computing device is located in a vehicle, one or more characteristics of output being rendered by a vehicle,
        wherein the vehicle includes a vehicle computing device that is separate from the mobile computing device;
    identify one or more features of the vehicle based on the one or more characteristics of the output,
        wherein the one or more features are detected using one or more interfaces of the mobile computing device;
    determine, based on the one or more features, a type of the vehicle in which the mobile computing device is located;
    when the type of the vehicle is a first type of vehicle:
        cause, based on the output being rendered by the vehicle, a display interface of the mobile computing device to render a first type of graphical output without rendering of a second type of graphical output; and
    when the type of vehicle is a second type:
        cause, based on the output being rendered by the vehicle, the display interface of the mobile computing device to render the second type of graphical output without rendering of the first type of graphical output.

10. The mobile computing device of claim 9, wherein the first type of graphical output includes a graphical rendering of a map that characterizes a location of the vehicle, and the second type of graphical output includes one or more selectable suggestions associated with the location of the vehicle.

11. The mobile computing device of claim 9, wherein in identifying the one or more features of the vehicle based on the one or more characteristics of the output one or more of the processors are to:
    process image data captured by a camera of the mobile computing device,
        wherein the image data characterizes an interior of the vehicle.

12. The mobile computing device of claim 11, wherein in determining the type of the vehicle in which the mobile computing device is located one or more of the processors are to:
determine whether the image data includes an image of a computer display interface located in the interior of the vehicle and separate from the mobile computing device.

13. The mobile computing device of claim 9,
wherein the output being rendered by the vehicle corresponds to a maintenance indicator that provides an indication of an issue with the vehicle, and
wherein the first type of graphical output includes one or more selectable suggestions that are based on the issue with the vehicle.

14. The mobile computing device of claim 13, wherein the second type of graphical output includes graphical content that characterizes instructions for resolving the issue with the vehicle.

15. The mobile computing device of claim 9, wherein in determining the type of the vehicle in which the mobile computing device is located one or more of the processors are to:
process, using one or more trained machine learning models, image data that includes one or more images of the output of the vehicle,
wherein the output includes light from one or more sources of light in the vehicle, and the one or more trained machine learning models are trained using training data that characterizes interior features of a variety of different vehicles.

16. The mobile computing device of claim 9, wherein in causing the display interface of the mobile computing device to render the first type of graphical output without rendering of a second type of graphical output one or more of the processors are to:
cause a client automated assistant of the mobile computing device to initialize an application that is not accessible via the vehicle computing device of the first type of vehicle.

* * * * *